June 8, 1954 W. F. MacGLASHAN, JR 2,680,454
REGULATOR VALVE
Filed Aug. 1, 1950
2 Sheets-Sheet 1

Inventor
William F. MacGlashan, Jr.

By G. J. Kesanich & J. H. Church
Attorneys

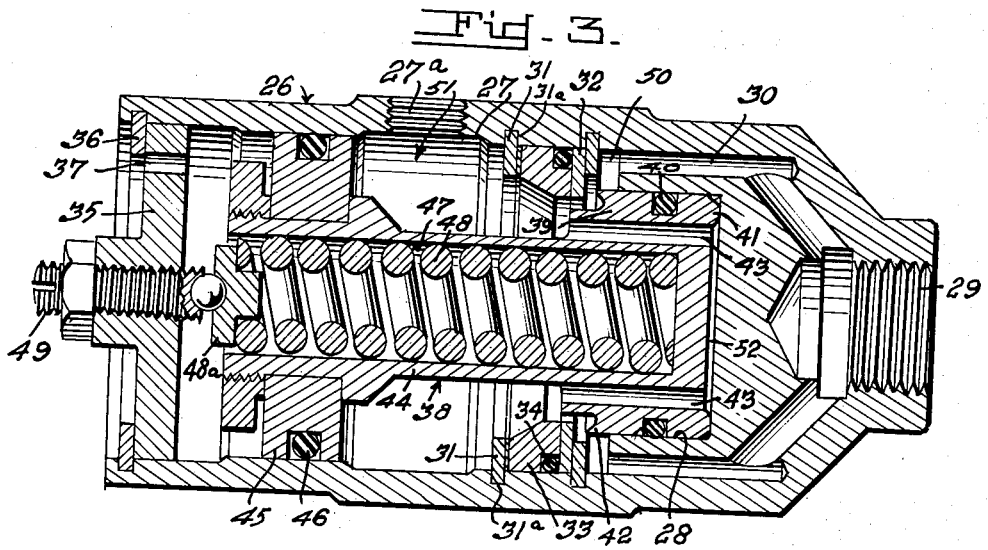

Patented June 8, 1954

2,680,454

UNITED STATES PATENT OFFICE 2,680,454

REGULATOR VALVE

William F. MacGlashan, Jr., Alhambra, Calif., assignor to the United States of America as represented by the Secretary of the Army Application August 1, 1950, Serial No. 177,053

4 Claims. (Cl. 137—505.28)

This invention relates to regulator valves and more particularly to regulator valves employed in rocket units.

It is an object of this invention to produce a regulator valve designed to maintain an outlet pressure which has a predetermined relation to the pressure existing in a counterbalancing chamber provided in the regulator valve.

Another object of the invention is a compact pressure regulator utilizing a pressure dome for regulating the outlet pressures.

Another object of the invention is a regulator valve having the characteristic of maintaining an outlet pressure in predetermined relation to a force exerted by means provided in the regulator valve.

Another object of the invention is a regulator valve, the inlet port of which has a common axis with the regulator piston to permit a very compact construction and a more favorable stress distribution at a point at which pressures are maximum.

Another object of the invention is a compact pressure regulator of a construction that permits simplified machining operations.

The specific nature of the invention as well as other objects and advantages thereof will clearly appear from the following description and accompanying drawings in which:

Fig. 3 is a longitudinal sectional view through another embodiment of the valve, showing the valve in open position.

Fig. 4 is a longitudinal sectional view of the valve of Fig. 3 in closed position.

Figure 1:
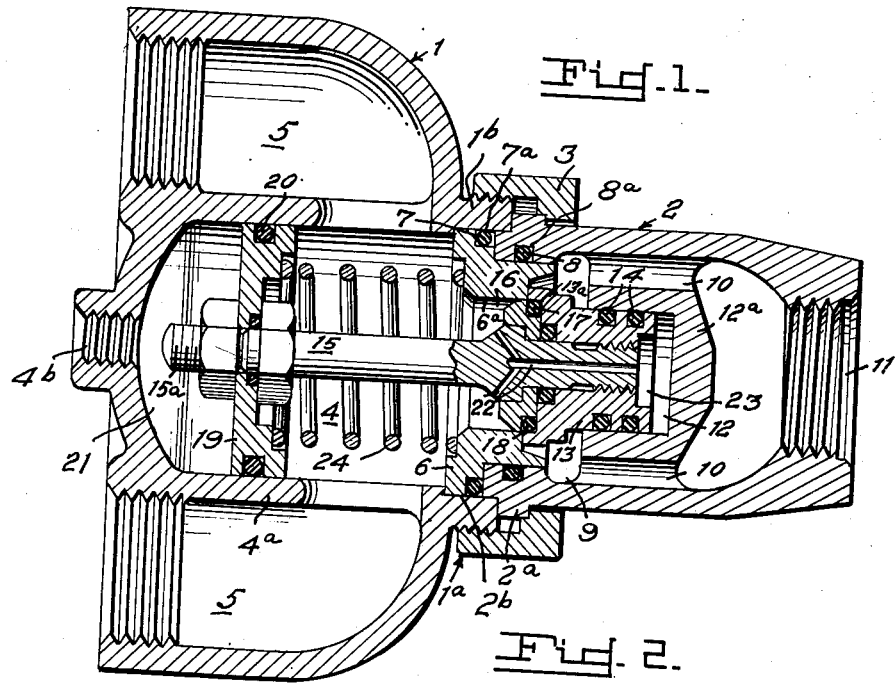
Fig. 1 is a longitudinal sectional view through one embodiment of the valve, showing the valve in closed position.
Figure 2:
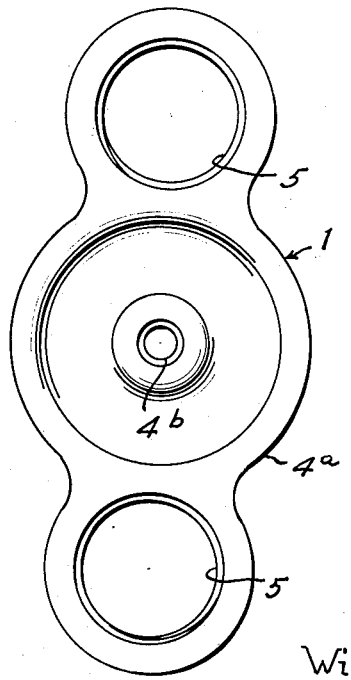
Fig. 2 is an end view of the outlet end of the valve shown in Fig. 1.

Referring to the drawings by character of reference, there is shown in Fig. 1 a regulator valve including a housing 1 and a cylindrically shaped housing 2 adapted to be fitted end to end as generally indicated by reference numeral 1a. The housing 1 is provided with an externally threaded neck 1b and the housing 2 with an external shoulder 2a. A retainer ring 3 joins the two housings in the manner of a union coupling. A cylindrical member 4a extending interiorly along the longitudinal axis of housing 1 and integral therewith defines a central cavity 4 open toward housing 2. The central cavity is intersected by outlet ports 5 in the form of elbow passages, the external ends of which are directed axially along the diametrically opposite sides of housing 1.

The joined ends of housings 1 and 2 define an internal channel 2b which receives the flange of a valve seat ring 6 projecting from housing 1 into housing 2. The confronting surfaces between the valve seat ring 6 and the housings 1 and 2 define suitable channels 7a and 8a in which are fitted O-rings 7 and 8. The valve seat ring and the adjacent recessed end of the housing 2 form a pressure chamber 9. The periphery of the pressure chamber 9 is connected by axially extending passages 10, formed in housing 2, to an inlet 11 provided at the opposite end of housing 2. Centered between the passages 10 and communicating with the chamber 9 is a cylinder 12a provided with a cylindrical recess 12 in which is received a piston 13. O-rings 14 provide a sealing connection between the cylinder and the piston 13 which is mounted on a valve stem 15 extending through the valve-seat ring 6 into the cavity 4. The piston 13 is threaded onto the valve stem 15 and clamps a valve-seal retainer ring 16 thereon. The retainer ring 16 and the base of piston 13 define an annulus 17, an edge of which is exposed and confronts one end of the perforation 6a in the valve seat ring 6 facing the pressure chamber 9, as best shown in Fig. 1. An O-ring valve seal 18 fits within the recess defined by the piston 13 and retainer ring 16 and engages the valve-seat ring 6. Radially outward from the valve seal 18, the valve-seat ring 6 and the piston 13 provide mating abutment shoulders which limit movement of the piston 13. Ports 13a for equalizing pressure are provided in the piston 13, connecting the annulus 17 with the pressure chamber 9, so that the rear portion of the O-ring 18 is subjected to the pressure in the chamber 9. The extended end 15a of the valve stem 15 is provided with a piston 19 which slides within the cavity 4 between the outlet ports 5 and the closed end of the cylindrical member 4a. An O-ring 20 provides a seal between the piston 19 and the walls of the cavity 4. The piston 19 and the closed extremity of cylindrical member 4a define a counterbalance chamber 21. The closed end of the cylindrical member 4a is provided with an inlet 4b for the admission of gases to effect a counterbalance. The valve stem 15, adjacent piston 13, is provided with a bypass 22 which connects a chamber 23, formed between the piston 13 and the closed end of cylinder 12a, with that portion of the central cavity 4 which communicates with the outlet ports 5. A compression spring 24 surrounds the valve stem 15 between the piston 19 and the valve-seat ring 6, holding the valve in its normally closed position.

In the operation of the valve described above, the counterbalance pressure chamber 21 is pressurized with gas from some external source to move the valve off its seat. Because of the bypass 22, the outlet pressure is applied to piston 13 in a direction to close the valve, so that a relatively constant outlet pressure may be maintained in a predetermined relation to the pressure existing in the counterbalance chamber 21.

Fig. 3 is a modification of the valve shown in Fig. 1 and includes a regulator valve body 26 which is preferably formed from cylindrical bar stock. One end of the body is provided with a deep recess or cavity 27 at the inner end of which is formed a further recess or cylinder 28 of smaller diameter. At the opposite end of the body 26 from the cavity 27 is an inlet port 29 which is connected with the cavity by flow passages 30 which bypass the cylinder 28. Adjacent the cylinder 28 the body 26 is provided with spaced internal grooves 31a which receive split rings 31. The split rings retain between them a valve seat 32 in the form of a flat ring and backing ring 33 provided with sealing means 34 adapted to seal against the walls of the cavity 27. The extended end of cavity 27 has fixed therein a disk 35 which is restrained against outward movement by a split retainer ring 36. The wall of cavity 27 is provided with a port 27a. The end plug is provided with a breather port 37. The cavity 27 receives a plunger 38 provided with a head 39 adapted to slidably fit within the cylinder 28, and a seal ring 40. The inner end of the plunger head 39 has formed thereon an annular rib 41 to limit the inward movement of the plunger head with respect to the bottom of cylinder 28. At the outer end of the plunger head 39 is an undercut valve lip 42 which is adapted to engage the valve seat ring 32 near its inner margin. The plunger head is also provided with bypass ports 43 which extend between its inner and outer extremities. The plunger 38 includes a stem 44 which extends through the valve seat ring 32 beyond the port 27a and has a piston 45 affixed to its end which terminates in the cavity 27 short of the disk 35. The piston is provided with a sealing means 46 which seal against the walls of cavity 27. The stem 44 is provided with a longitudinal bore 47 which extends substantially the length of the plunger and is open toward the disk 35. The stem houses in the bore a spring 48 having a support button 48a fixed in its end adjacent the disk 35. The spring is adjustably retained in the bore 47 as by a set screw 49 in the disk 35.

The valve components as described in the preceding paragraph form a high pressure compartment 50 between the valve seat 32 and inner end of cavity 27 communicating with the inlet port 29. A low pressure chamber 51 is formed between the valve seat 32 and the piston 45, and a third chamber 52 is formed between the plunger head 39 and the closed end of cylinder 28; chamber 52 being in communication with chamber 51 by means of bypasses 43 in the plunger head.

The regulator valve of Fig. 3 is normally open with the annular rib 41 engaging the closed end of cylinder 28. When the pressure in chamber 51 rises the pressure is communicated to chamber 52 and to the piston 45, causing the plunger 38 to move in opposition to the spring 48 until the valve is closed. The pressure in chamber 50 has no effect on movement of the valve, since the areas are substantially balanced with respect to pressure in this region. The pressure in chamber 51 is dependent upon the force exerted by spring 48 and is therefore maintained at a constant value.

I claim:

1. In a regulator valve, a casing having its top portion apertured and a cylindrical member extending inwardly of said casing from said aperture, said cylindrical member comprising a pressure dome, outlet passages formed in said casing and spaced radially about said pressure dome, the inner ends of said passages intersecting the cylindrical walls of said pressure dome adjacent said aperture, a valve seat ring positioned in said aperture, a tubular member having one end embracing said ring and coupled to said casing, there being an inlet formed in the other end of said tubular member, a pressure chamber formed in said tubular member adjacent said ring, a piston receiving cylinder integral with said tubular member and positioned intermediate said pressure chamber and the inlet of said tubular member, axially extending passages spaced about said cylinder and connecting said pressure chamber with said inlet, a valve normally seated on said ring and having a piston formed integral therewith slidable in said cylinder, the stem of said valve extending along the longitudinal axis of said casing and into said pressure dome, a piston mounted on the end of said stem and slidable in said pressure dome, expansion means positioned about said stem in contact with the piston in said pressure dome and said ring to releasably hold said valve closed, said piston responding to a differential in pressure between said casing outlet passages and said pressure dome to open said valve.

2. A pressure regulating valve comprising, an elongated tubular housing having a central fluid inlet, a fluid outlet through the side wall of said housing, and an elongated valve chamber between said inlet and said outlet, a transverse partition in said housing integral therewith adjacent said inlet and forming therewith an inlet chamber, a valve seat ring intermediate said partition and said outlet having its outer periphery engaging the inner wall of said housing and forming with said partition a high pressure chamber, said housing forming a low pressure chamber downstream of said valve seat ring, said partition having an axially disposed cylindrical cavity closed off on the side facing said inlet and having a plurality of longitudinal bores radially outwardly of said cavity connecting said inlet chamber with said high pressure chamber, an elongated piston extending through said valve seat ring and slidably engaging the side walls of said cavity and having a recess formed in the side of said piston facing the transverse wall of said cavity to form therewith a by-pass chamber, an enlargement integral with said piston engaging said valve seat ring to close said valve and to separate said high pressure chamber from said low pressure chamber when said valve is closed, said piston having a longitudinal bore connecting said by-pass chamber with said low pressure chamber, means within said housing engaging and moving said piston and enlargement to valve opening position, said means being effective to provide a predetermined pressure in said low pressure chamber, whereby a rise in pressure in said low pressure chamber above said predetermined pressure is transmitted by way of said longitudinal bore to said by-pass chamber to move said enlargement toward valve closing position to maintain said predetermined pressure in said low pressure chamber.

3. A pressure regulating valve comprising an elongated tubular housing having first and second opposed transverse walls closing the ends thereof, and having a fluid inlet in said first transverse wall, and a fluid outlet through the side wall of said housing adjacent said second transverse wall, a partition in said housing intermediate said inlet and said outlet and forming with said inlet an inlet chamber, said partition having an axial cylindrical cavity having a transverse wall facing said first transverse wall of said housing, a valve seat ring having its outer peripheral surface engaging the inner wall of said housing intermediate said partition and said outlet, forming with said partition a high pressure chamber, and with said second transverse wall a low pressure chamber, said partition having diametrically opposed longitudinal bores outwardly of said cavity connecting said inlet chamber with said high pressure chamber, an elongated piston extending through said valve seat ring, slidably engaging the side walls of said partition cavity and having an annular recess facing the transverse wall of said cavity to form therewith a by-pass chamber, said piston having a longitudinal bore connecting said by-pass chamber with said low pressure chamber, an elongated stem on said piston extending axially toward said second transverse wall, a cylindrical piston in said housing intermediate said outlet and said second transverse wall engaging the inner wall of said housing and having a central aperture to receive said stem, an enlargement integral with said elongated piston adapted to engage said valve seat ring to separate said high pressure chamber from said low pressure chamber to close said valve, a coil spring about said stem having one end abutting said valve seat ring and the other end abutting said cylindrical piston to bias said enlargement into engagement with said valve seat ring, said second transverse wall having an opening to admit fluid pressure into said housing against said cylindrical piston to thereby move said enlargement out of engagement with said valve seat ring whereby said valve is opened.

4. In a regulator valve, a first casing having an inlet port at one end and a pressure chamber adjacent its opposite end, a piston receiving cylinder formed integral with said first casing intermediate its ends, a valve seat positioned adjacent said opposite end in said first casing, a second casing coupled to the opposite end of said first casing, a pressure dome formed within said second casing, said second casing having diametrically opposed outlet ports formed in a wall opposed to said coupled end and in open communication with said pressure dome adjacent said valve seat, a valve normally positioned on said valve seat, a first piston integral with said valve axially slidable in said piston receiving cylinder, a second piston axially slidable in said pressure dome having an elongated stem integral with said valve, means urging said second piston to position in said pressure dome to achieve a predetermined pressure therein, said second piston being responsive to a drop in pressure below said predetermined pressure in said dome to move said valve toward open position, said first piston having a longitudinal bore formed therein having one end communicating with a by-pass chamber formed between said first piston and said piston receiving cylinder and the other end with said pressure dome whereby a rise in pressure in said pressure dome above said predetermined pressure moves said valve toward closing position until said predetermined pressure is re-attained.

References Cited in the file of this patent

UNITED STATES PATENTS

| Number | Name | Date |
|---|---|---|
| 2,202,313 | Grove | May 28, 1940 |
| 2,307,949 | Phillips | Jan. 12, 1943 |
| 2,487,650 | Grove | Nov. 8, 1949 |
| 2,590,622 | Huber | Mar. 25, 1952 |

FOREIGN PATENTS

| Number | Country | Date |
|---|---|---|
| 199,534 | Great Britain | 1923 |